Patented July 7, 1942

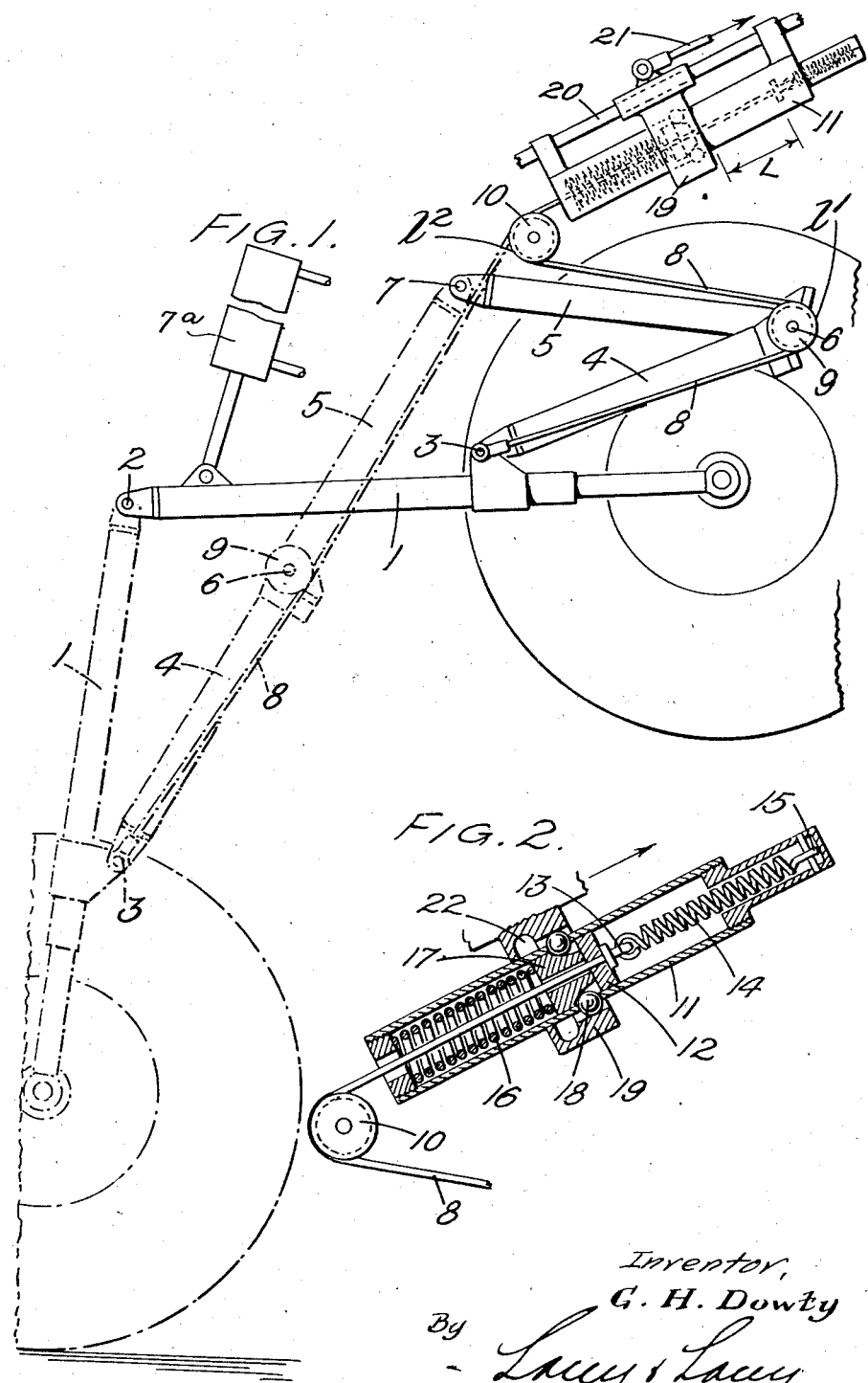

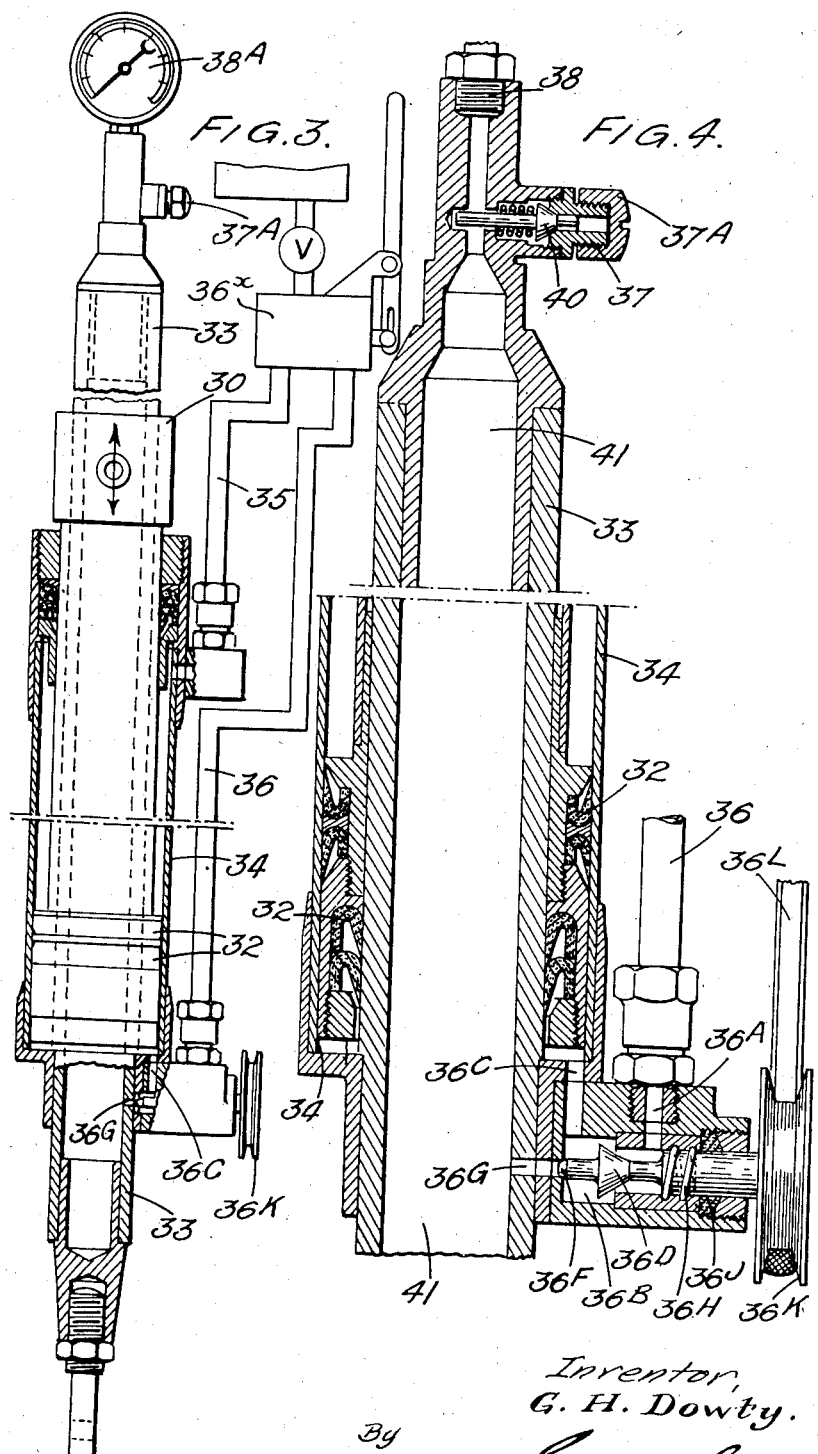

2,288,968

UNITED STATES PATENT OFFICE 2,288,968

UNDERCARRIAGE FOR AIRCRAFT

George Herbert Dowty, Cheltenham, England

Application October 12, 1936, Serial No. 105,337
In Great Britain October 12, 1935

9 Claims. (Cl. 244—102)

This invention relates to undercarriages for aircraft. Its principal object is to provide means whereby the pilot may ensure the proper extension of an undercarriage prior to landing. It is sometimes the case that owing to technical difficulties or hydraulic failures, including broken pipelines, that a retractable undercarriage may fail to extend; or having partially extended, may not extend completely. The invention is concerned with the provision of auxiliary means, additional to the means normally employed for extension, to ensure extension in such emergencies.

Accordingly the invention consists in the provision, for combination with an aircraft retractable undercarriage having means for extension in ordinary circumstances, additional means for emergency extension comprising a source of energy, and transmission means between said source and the point to which extending power is to be applied, said source and its transmission being separate from and operatively independent of the ordinary means for extension. In one form of the invention there is provided a spring adapted to be releasable, held in a state of distortion (in which state it is, of course, a source of energy) and adapted to extend the undercarriage upon release. Preferably such a spring is held in compression by a readily releasable catch, and there is a connection between the spring and moving parts of the undercarriage whereby extension of the spring (upon release thereof) urges the undercarriage toward complete extension. The connection is preferably a cable, and in such case there may be an additional spring which is light relatively to the first spring, to keep the cable under initial tension. In another embodiment of the invention which is adapted for completing or effecting the extension of a hydraulic jack-operated retractable undercarriage, there is provided a source of energy in the form of a pressure reservoir preferably for compressed air, and a valve arrangement for cutting off from the jack the source of pressure which is ordinarily in use for undercarriage extension, and connecting the pressure reservoir to the jack. Preferably the pressure reservoir is built integral with the jack, and a convenient arrangement is that the reservoir is formed by the internal hollow space within the stem of a jack, where the jack is of the kind having an internal stem and an annular piston or ram sliding thereon and within a cylinder. Preferably the valve is constituted by a single and readily moveable member adapted to be moved from one extreme position to another, and by such movement to effect the cut-off and connection above mentioned. The two above outlined embodiments of the invention are shown in the accompanying diagrammatic drawings, in which:

Figure 1 is a side elevation of one embodiment of the invention, portions of the interior of the cylinder employed being shown in broken lines and the undercarriage also being shown in broken lines in extended position and in full lines in retracted position, the ordinary means for extending the undercarriage being shown diagrammatically.

Figure 2 is an enlarged detail sectional view, partly in elevation, of the cylinder and cable actuating mechanism therein.

Figure 3 is a vertical sectional view, partly in elevation, of a hydraulic jack forming a part of another embodiment of the invention, the ordinary means of extension for the jack being shown diagrammatically.

Figure 4 is an enlarged detail sectional view, partly in elevation, of the jack of Figure 3, the view being truncated to show the lower portion of the device on a larger scale.

In Figure 1 the undercarriage comprises a wheel-carrying leg structure 1 pivoted for rearward and upward swinging at 2 and having pivoted thereto at 3 a knuckle-jointed or articulated radius rod comprising the lower part 4 and upper part 5 interconnected at the axle 6, the upper part 5 being pivotally anchored at 7. At 7ᵃ is shown, diagrammatically, the means for extending the undercarriage under normal operating conditions. The pivots 2 and 7 are, of course, intended to be fixed anchorages in the aircraft. The undercarriage is shown in full line retracted and in broken line extended. At the pivot 3 there is attached one end of a cable 8 which is led over a pulley or fairlead 9 which is carried coaxially with the joint 6, and then over a pulley or fairlead 10 which is suitably rotatable mounted in the aircraft, and thence into a cylinder 11 which is fixed in the aircraft. The other end of the cable 8 has a stop upon it in any suitable form such as the collar 12, and an eye 13 in which engages a relatively light tension spring 14 the other end of which is fixed at 15 within an extension of the cylinder 11. Also within the cylinder 11 there is a robust and strong compression spring 16, which is compressed between the lower end of the cylinder and a tapered conical locking member 17 which can bear against the stop 12. In the wall of the cylinder there is a ring of holes in which normally lie a row of locking balls 18 which are held against the tapered part of the member 17 by bearing against the inner face of an annular sliding release element 19 which is conveniently slidably carried as by a rod 20 and has means such as the cord 21 for directly pulling it upwards. Within the annular releasing part 19 there is a radial enlargement or hollow 22 which will wholly accommodate the balls 18. Consequently when the cord 21 is pulled so that the part 19 slides upwards, the balls 18 can fall outwards into the space 22 and the locking member 17 is then released for axial movement under the influence of the spring 16 and can consequently impose tension in the cable 8. It is intended that at all normal times the spring 16 is kept distorted under compression and locked. If difficulty be encountered in extending the undercarriage completely, whether initially or towards the end of its travel, all the user has to do is to pull the cord 21 when the consequent tension in the cable 8 in, so to speak, shortening up around the pulleys 9 and 10, urges the undercarriage towards extension. During normal extension the slack which would otherwise occur in the cable is taken up by the spring 14. The amount by which the cable can be taken up during extension is represented by L, which is the sum of $l^1-l^2$, this being the length of cable which is, so to speak, temporarily wrapped around pulleys 9 and 10 respectively. It will be understood that the particularly cylindrical form of the part 11 and the precise locking means therein, are adopted for convenience and may be departed from very considerably. It will also be appreciated that this part of the device might be situated quite remotely from the undercarriage providing that the leading of the cable 8 is properly arranged to effect its purpose.

Turning now to Figures 3 and 4, in this case there is not represented a complete undercarriage, but only a hydraulic jack of a kind commonly incorporated in undercarriages or in association with undercarriages for the purpose of retracting and extending them in accordance with the direction of flow of liquid in a two-pipeline hydraulic system operating from a suitable pressure source. The kind of jack involved is that in which a ram element 30 of tubular form and having at its inner end an annular piston head 31 with packings such as 32, is slidable upon a fixed stem 33 which may act as a beam attached at each of its ends to appropriate anchorages in the aircraft, and to which there is attached a cylinder 34 in which the annular piston head 31 slides, sweeping the annular cylindrical space between the exterior of the stem 33 and the cylinder 34. The invention is particularly well adapted to be applied to this type of jack, and one of its features consists in the adaptation of the jack to the requirements of the invention. To the interior of the cylinder 34 there communicates one pressure pipe 35 and a second pressure pipe 36, and these connect respectively to the opposite sides of the piston 31. The pipe 35 is the positive pressure pipe for retraction, and the pipe 36 the positive pressure pipe for extension, in ordinary usage, the means for extending the undercarriage under normal operating conditions being shown diagrammatically at 36$^x$.

The stem 33 is hollow, and its interior is hollow and is capable of withstanding considerable internal pressure. At its upper end it is equipped with a union at 37 which is shown in the drawings protected and finally sealed by a cap 37A and a union 38 for a pressure gauge 38A. Within the union 37 there is a non-return spring pressed inlet valve 40, so that this unit 37 is usable for inflating the interior of the stem 33, the space of which is indicated at 41 and comprises a pressure reservoir.

Reverting to the pipe 36 and its connection to the cylinder 34, in the ordinary way the communication is by a passage 36A, valve chamber 36B, and further passage 36C. In the valve chamber 36B there is a screw valve having a conical head 36D adapted to cut off communication between 36A and 36B at one extreme axial position of the valve, and simultaneously a conical face 36F is raised from a seat which forms the mouth of a port 36G, putting the reservoir 41 into communication with 36B and consequently with the interior of the cylinder 34 below the piston 31. The valve, for controlling its axial movement, preferably has a quick pitch thread 36H and passes through a gland 36J and operating means of any suitable kind represented in the drawing by a pulley 36K engaged by a strap 36L. In emergency, and assuming the reservoir 41 to be fully charged, all that is required is to pull the strap 36L whereupon the thread 36H causes the face 36F to open 36G, whilst 36D cuts off any communication from pipe 36. Since this happens practically simultaneously, the pressure in 41 is immediately operative to urge the ram 30 outwards (i. e. upwards in the drawings), and this effects complete extension of the undercarriage. It will be observed that this design will remain operable even if the pipe 36 is broken and wherever it might break. It will also be appreciated that the invention can be carried out in a good many other ways, the above described way being a convenient application of it to an existing type of double-acting hydraulic jack. It will also be appreciated that the emergency extending means are not well adapted to be used more than once; for example, there is no means described by which the operative reserve pressure can be relieved. It is for this, among other reasons, that it must be emphasized that the device is regarded as auxiliary to extending means ordinarily in use. If it be desired to prevent air entering the more truly hydraulic parts of the device, the chamber 41 may have a floating piston to separate compressed air from liquid, and so that although the source of energy is the air, the working medium (for emergency extension) will be the liquid.

The emergency extending means may be arranged or adapted to release or actuate any undercarriage locks, signals, or other auxiliary devices, such as might ordinarily be actuated by or during the operation of ordinary extension.

The invention is not concerned with the known device in which a source of energy used for each extension of an undercarriage is charged or replenished by each immediately preceding retraction, because in such case, the extending means could not be said to constitute an auxiliary and emergency extending means, not liable to suffer damage or disruption or leakage and therefore always available. "Ordinary means" for extension signifies any means in ordinary use in normal circumstances for repeated undercarriage extension.

What I claim is:

1. In a retractable aircraft undercarriage, undercarriage structure adapted for retraction, a hydraulic jack adapted to retract and extend said structure, a source of fluid pressure to operate the jack for extension ordinarily, a valved connection between the source and said jack, a pressure reservoir constituting a second source of fluid pressure independent of the first source, said pressure reservoir being contained within the confines of said jack, and a valved connection between the second fluid source and said jack, said second fluid source being adapted to supply fluid to the hydraulic jack for extending the undercarriage upon failure of the first source of fluid pressure.

2. A retractable aircraft undercarriage comprising an undercarriage structure adapted for retraction and extension, a hydraulic jack adapted to retract and extend said structure and including a cylinder, an annular piston therein, a source of fluid pressure externally of said cylinder, a valved connection between the source of fluid pressure and said cylinder, said fluid pressure being adapted to operate the jack for ordinarily extending the undercarriage structure, a cylindrical sealed hollow stem surrounded by the cylinder and defining a reservoir having a second fluid source, and a valve operable for permitting fluid flow between the reservoir and the jack whereby the jack will be operated for extending the undercarriage structure in an emergency.

3. A retractable aircraft undercarriage as recited in claim 1, wherein the valved connections comprise a unitary multi-position valve mounted on the jack.

4. In a retractable aircraft undercarriage structure, a jack operable for extending and retracting the undercarriage structure, a source of fluid pressure for the normal operation of the jack, a source of fluid pressure energy within the jack independent of the first source, and a valve common to both sources of energy forming a part of the jack structure and operable for selectively energizing the jack from either source.

5. In a retractable aircraft undercarriage structure, a fluid operated jack operable for extending and retracting the structure, a source of fluid pressure exteriorly of the jack for operating the jack normally, a second source of fluid pressure within the jack, and a valve common to both sources of fluid pressure and being shiftable from a position admitting fluid pressure to the jack from the first source of fluid pressure to a position releasing the fluid pressure from the second source of fluid pressure for operating the jack upon failure of the first source 6. In a retractable aircraft undercarriage structure as recited in claim 2, wherein the valved connection and valve comprise a unitary valve on the jack.

7. A retractable aircraft undercarriage comprising an undercarriage structure adapted for extension and retraction, a fluid pressure operated jack operatively connected with the undercarriage structure for extending and retracting said structure, a first means located externally of the jack providing a source of fluid pressure for extending and retracting the undercarriage under normal conditions, a second means within the confines of the jack providing a source of fluid pressure for emergency extension of the undercarriage, conduits connecting each of said means to the operating mechanism of the jack, a unitary valve forming a part of the jack structure and common to both conduits, and a device to position said valve to selectively establish communication between the jack operating mechanism and one of said means.

8. In a retractable aircraft undercarriage, undercarriage structure adapted for retraction, a hydraulic jack adapted to retract and extend said structure, a source of fluid pressure to operate the jack for extension ordinarily, a valved connection between the source and said jack, a pressure reservoir constituting a second source of fluid pressure independent of the first source, said pressure reservoir being mounted rigid with said jack, and a valved connection between the second fluid source and said jack, said second fluid source being adapted to supply fluid to the hydraulic jack for extending the undercarriage upon failure of the first source of fluid pressure.

9. In a retractable aircraft undercarriage structure, a fluid operated jack operable for extending and retracting the structure, a source of fluid pressure exteriorly of the jack for operating the jack normally, a second source of fluid pressure mounted rigid with the jack, and a valve common to both sources of fluid pressure and being shiftable from a position admitting fluid pressure to the jack from the first source of fluid pressure to a position releasing the fluid pressure from the second source of fluid pressure for operating the jack upon failure of the first source.

GEORGE HERBERT DOWTY.